March 10, 1964
W. T. BURT
3,123,985
CONTROL APPARATUS
Filed June 14, 1962
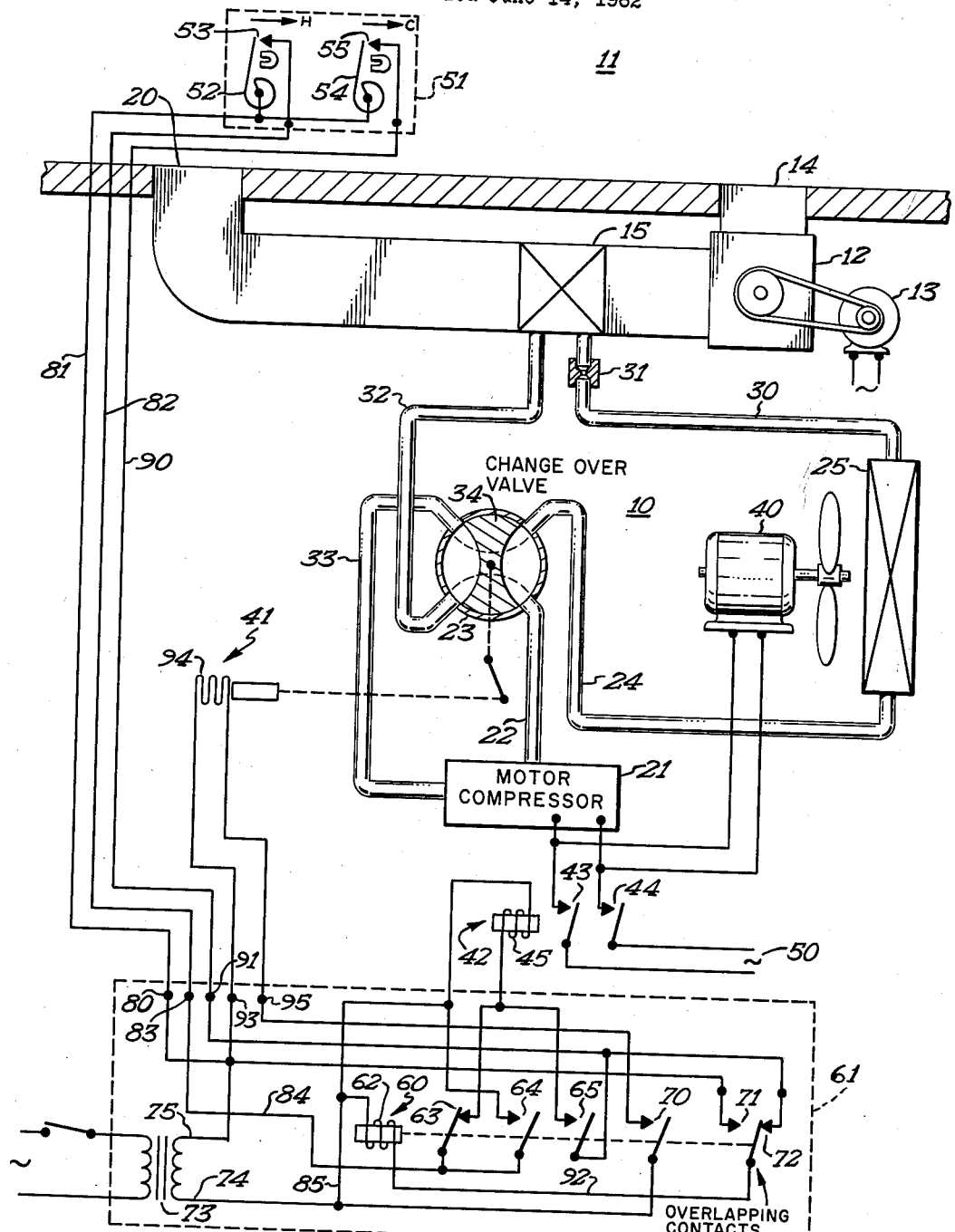
INVENTOR.
WILLIAM T. BURT
BY
*Clyde C. Clinn*
ATTORNEY United States Patent Office 3,123,985
Patented Mar. 10, 1964

3,123,985
CONTROL APPARATUS
William T. Burt, Minneapolis, Minn., assignor to Minneapolis-Honeywell Regulator Company, Minneapolis, Minn., a corporation of Delaware
Filed June 14, 1962, Ser. No. 202,461
4 Claims. (Cl. 62—160)

The present invention is concerned with an improved non-flushing heat pump control system; in particular, a control system providing for the operation of a changeover valve in a refrigeration system which supplies heating and cooling so that upon the operation of the refrigeration system in one manner for heating, the changeover valve is not operated each time a temperature responsive device calls for heating.

In recent years, heat pumps or reversible refrigeration systems have become more popular for residential heating and cooling. Such heat pumps are used as window air conditioning units as well as central heating and cooling installations. When the refrigeration system is used for heating and cooling, the changeover between heating and cooling is accomplished by a valve or valve system to redirect the refrigeration flow in the system. When the system is connected in a manner to provide heating by the delivery of heat to a heat exchanger or condenser coil, an arrangement is quite common to maintain this system so the refrigeration flow is undisturbed when the motor compressor is de-energized upon the satisfaction of the air thermostat. In other words, the change in the refrigeration flow accomplished by a changeover valve is only done when the system must be rearranged to provide cooling by the reconnection of the refrigeration system so the previously mentioned condenser coil is used as an evaporator coil.

A phenomena known as "flushing" is experienced when a changeover valve in a heat pump system is allowed to return to one position each time the space temperature thermostat is satisfied. The flushing describes the noise which is brought about by the equalization of pressure in the refrigeration system when the system is connected, for example, for the delivery of heat to a condenser coil and upon the de-energization of the compressor, the changeover valve is operated to reconnect the system for the delivery of cooling or a connection to make the previously mentioned condenser coil the evaporator coil.

While non-flushing heat pump control systems are old, these sytems involve elaborate and complicated circuits with many relays to establish a holding system to maintain the changeover valve in one position throughout the heating operation. The applicant was faced with the problem of reducing the cost of a system for accomplishing a non-flushing type of operation with an automatic changeover heating and cooling system. In the attempt to provide such a system, the present invention was conceived.

In the present invention, a single relay is used with the space heating and cooling thermostat to control the operation of the changeover valve. When energized by the heating thermostat, the relay operates the changeover valve in one position and even though the heating thermostat becomes satisfied, a holding circuit maintains the relay energized so the changeover valve remains in the one position. Upon an automatic changeover by a call for cooling, the cooling thermostat shorts out the source of power to the single relay to change the system for cooling by allowing the valve to be in the other position.

An object of the present invention is to provide an improved "non-flushing" heat pump control system having a single relay which is held in an energized position during a heating period and the source of power is shorted to de-energize the relay during the cooling period.

Another object of the present invention is to provide a reversible refrigeration heating and cooling system using a single actuator for accomplishing the changeover of the system and for only changing the system when a space thermostat automatically changes the demand from heating to cooling or cooling to heating.

These and other objects of the present invention will become apparent upon the study of the following specification and drawing of which:

A single figure is a schematic representation of a heat pump or reversible refrigeration system with the improved "non-flushing" changeover operation using the single actuator to accomplish the changeover.

Referring to the single figure, a conventional heat pump or reversible refrigeration system 10 is shown for providing heating and cooling to a space 11. Air is circulated through space 11 by a forced air system having a fan 12 which is driven by a constantly energized motor 13. Fan 12 draws air through a return duct 14 and forces the air through a heat exchanger or coil 15 so the conditioned air is delivered to space 11 through supply duct 20.

Coil 15 is connected into the refrigeration system 10 in the following manner: from a motor driven refrigeration compressor 21, conduit 22, a changeover valve 23, conduit 24, a heat exchanger or coil 25, a conduit 30, a restriction 31, coil 15, a conduit 32, valve 23, a conduit 33 and back to the motor compressor. As shown, a movable member or plug 34 in the changeover valve is in the upright position to allow flow through the flow circuit previously traced which results in using coil 15 as an evaporator to cool the air passing through the coil for cooling space 11. Coil 25 is the condenser coil for removing heat from the compressed refrigerant by blowing air through coil 25 with a motor driven fan 40. Upon the operation of a changeover valve solenoid actuator or relay 41, member 34 is moved 90° in the position shown by dotted lines. In the alternate position of member 34, valve 23 changes the system so coil 15 is the condenser coil and coil 25 is the evaporator coil. With this type of operation, the refrigeration system delivers heat to the air passing through coil 15. The reversible refrigeration system shown is only one typical system and the applicant's invention is applicable to other types of reversible refrigeration systems which use a changeover means comprising at least one valve.

A contactor or relay 42 has a pair of switches 43 and 44 which are closed when an energization winding 45 is connected to a source of power. Switches 43 and 44 are connected in the power supply circuit of motor compressor 21 and fan motor 40. When relay 42 is energized, a source of power 50 brings about the operation of refrigeration system 10.

The space thermostat or temperature responsive switching device 51 has a first bimetal 52 for closing a switch 53 when the temperature of the bimetal exceeds some predetermined value. A second bimetal 54 closes a switch 55 when the temperature of the bimetal drops below some predetermined value. Switches 53 and 55 provide for the control of the refrigeration apparatus 10 to deliver hot or cold air to space 11 depending upon the needs of the space. The thermostat 51 is of the automatic changeover type which depends upon the temperature to determine whether heating or cooling is needed in space 11.

A single relay 60 is contained in a panel 61. Relay 60 has an energization winding 62, and a plurality of switches actuated thereby upon energization of the relay. The switches of relay 60 are as follows: a normally closed switch 63, three normally open switches 64, 65 and 70, and a normally open switch 71 and a normally closed switch 72. Switches 71 and 72 are of the overlapping contact type which operate in a manner to provide a closure of switch 71 before 72 is opened upon the energization of relay 60. Panel 61 also contains a transformer 73 to provide a low voltage source of power between the secondary terminals 74 and 75.

Thermostat 51, actuator 41, and contactor 42 are connected to panel 61 in the following manner. Upon the closure of switch 53 to call for cooling to space 11, contactor 42 is operated through a circuit traced as follows: from secondary terminal 75, terminal 80, conductor 81, switch 53, a conductor 82, a terminal 83, a conductor 84, switch 63, winding 45, a conductor 85 and back to terminal 74 of the source of power. Actuator 41 is not energized; therefore, upon the operation of motor compressor 21 with the changeover valve in the position as shown, coil 15 is the evaporator and the air circulating through the coil is cooled to deliver cold air to space 11. When the cooling thermostat is satisfied and switch 53 opens, relay 42 is de-energized and the motor compressor is shut down. During the cooling operation, the changeover valve stays in the position as shown even when the cooling thermostat is not closed to call for cooling.

Upon a need for heating in space 11, the heating thermostat or switch 55 closes to energize the changeover solenoid 41, actuator 42, and relay 60 in the following manner. Relay 60 is energized through a circuit traced as follows: from terminal 75, terminal 80, conductor 81, switch 55, a conductor 90, terminal 91, switch 72, a conductor 92, winding 62, conductor 85 and back to the secondary terminal 74. Upon the energization of relay 60, switch 71 closes before switch 72 opens. Switch 71 provides a holding circuit for relay 62 which is traced as follows: from secondary 75, switch 71, conductor 92, winding 62, conductor 85 and back to terminal 74. The changeover actuator 41 is energized by the closure of switch 70 through a circuit traced as follows: from terminal 75, a terminal 93, a winding 94 of solenoid 41, a terminal 95, switch 70, and back to the secondary terminal 74. When solenoid 41 is closed, member 34 moves to the position shown by the dotted lines to reconnect the refrigeration flow so that coil 15 is the condenser coil. Upon the subsequent operation of motor compressor 21 by the energization of contactor 42, heat is delivered to coil 15 to heat the air delivered to space 11. The energization of contactor 42 upon the closure of the heating thermostat is accomplished by a circuit traced as follows: from terminal 75, terminal 80, conductor 81, switch 55, conductor 90, switch 65, winding 45, conductor 85 and back to the secondary terminal 74. The energization of contactor 42 closes switches 43 and 44 to bring about the operation of refrigeration apparatus 10.

In order to prevent the "flushing" phenomena which was mentioned earlier in the specification, relay 60 prevents the de-energization of the changeover valve actuator 41 when the heating thermostat is satisfied as long as the system is maintained for subsequent heating operation. When switch 55 opens, relay 60 is not de-energized as the previously mentioned holding circuit through switch 71 remains established. Switch 55 is effective to de-energize actuator 42 to stop the operation of the refrigeration apparatus. Thus upon a subsequent cycling of the heating thermostat by the opening and closing of switch 55, the refrigeration apparatus 10 is cycled with valve 23 remaining in the position shown in the dotted lines for the heating operation. When switch 55 is opened and the refrigeration apparatus motor compressor 21 is de-energized, the system does not make the noise which would be made if valve 23 was allowed to move to the position as shown with the member 34 in the position for cooling. If valve 23 was de-energized each time the heating thermostat was satisfied, the equalization of presures due to the flow of refrigerant through the system would be quite noisy.

Upon a change of operation to cooling, the automatic changeover is accomplished with thermostat 51. A call for cooling is provided when switch 53 closes. Switch 53 first shorts out the power by placing a short across terminals 74 and 75 of the secondary winding to de-energized relay 60 by a circuit traced as follows: from terminal 75, terminal 80, conductor 81, switch 53, conductor 82, switch 64, and back to the other side of the secondary winding 74. The short on the transformer is only momentary as once the relay 60 is de-energized, switch 64 opens to remove the short. When relay 60 is de-energized, switch 63 is closed and the normal operation of the refrigeration apparatus by the energization of contactor 42 is accomplished as long as switch 53 remains closed.

*Operation*

The operation of the automatic changeover heat pump or reversible refrigeration system provides for either heating or cooling to space 10 depending upon which thermostat is closed. Assuming that the heating thermostat or switch 55 closes, relay 60 is energized and a holding circuit accomplished through the overlapping contact switch 71 is provided to maintain the relay energized even though the heating thermostat becomes satisfied and switch 55 opens. When relay 60 is energized, solenoid 41 is energized to operate the changeover valve 23 of the refrigeration system 10. The changeover valve is operated so member 34 is in a horizontal position as shown in dotted lines. In this position, coil 15 is the condenser coil and heat is delivered to the air circulating from space 11. The closure of switch 55 energizes contactor 42 to bring about the energization of the motor compressor. Even though switch 55 opens, solenoid 41 and relay 60 will remain energized so that the changeover valve 23 stays in a heating position as long as the system is established for subsequent heating.

Upon an automatic changeover to cooling by the increase in the space temperature from a predetermined value to close switch 53, a short circuit is placed across the secondary terminals 74 and 75 of the transformer to de-energize relay 60. Upon the de-energization of relay 60, solenoid 41 is de-energized and the changeover valve returns to the position as shown so that coil 11 is the evaporator coil. Upon a subsequent operation of the cooling thermostat by closing and opening switch 53, the compressor contactor 42 is operated to energize compressor 21; however, during the cooling operation, the valve 23 is not operated and remains in the position as shown. The operation of valve 23 only takes place when the system automatically changes over to the heating operation by a drop in the space temperature below some predetermined value to result in the closure of switch 55.

By the use of the single relay 60, a "non-flushing" type of operation for the refrigeration system 10 is accomplished. The heating operation is maintained when relay 60 is energized and held in an energized condition by the holding circuit. The cooling operation results in a short circuit of the power source to de-energize relay 60 and render the system so that only actuator 42 operates upon the call for cooling. In this manner, the changeover valve remains in either the position shown or the position shown by the dotted lines for member 34 during the heating and cooling operations, respectively. No operation of the changeover valve exists during intermittent subsequent calls for heating or cooling without the changeover from heating to cooling or cooling to heating.

While the invention has been described in one particular manner, the intention is to limit the invention only by the scope of the appended claims in which

I claim:

1. In an automatic changeover control system for a reversible refrigeration system, a motor compressor, a first heat exchanger for changing the temperature of air in a space, a changeover valve, a second heat exchanger, means connecting said motor compressor, said changeover valve, and said first and second heat exchangers in a refrigeration system whereby heat is deliveerd to said air upon said valve being in a first position and taken from said air upon said valve being in a second position, a first relay means having a first energization winding, a first normally closed switch, three normally open switches, and fourth normally open switch and second normally closed switch, said fourth switch and said second closed switch having overlapping action whereby said fourth switch closes before said second switch opens upon energization of said second relay means, a source of power, a first and a second temperature responsive switch means located in the space to be responsive to air temperature, said first temperature responsive switch means closing upon a drop in air temperature below a predetermined value, said second responsive switch means closing upon an increase in air temperature above a predetermined value, circuit means connecting said first energization winding, said second responsive switch means and said first normally closed switch in series to said source whereby upon a call for cooling said motor compressor is energized with said valve in said second position, circuit means connecting said second energization winding, said first responsive switch means, and said second normally closed switch in series to said source, a holding circuit for said second relay comprising said fourth switch for connecting said second energization winding directly across said source to maintain said second relay energized, a changeover valve actuating relay for controlling said valve to one of said first and second positions, circuit means including one of said three normally open switches for connecting said actuating relay to said source so upon a call for heat by said first responsive switch means said changeover valve is operated in said first position, circuit means including one of said three switches and said first responsive switch means for connecting said first energizing winding to said source, and a shorting circuit comprising one of said three normally open switches and said second responsive switch means for shunting said second energization winding upon a call for cooling to restore said changeover valve to said second position.

2. In an automatic changeover control system for a reversible refrigeration system having a motor compressor, a first heat exchanger for changing the temperature of air in a space, a changeover valve, a second heat exchanger, and means connecting said motor compressor, said changeover valve, and said first and second heat exchangers whereby heat is delivered to said air upon said valve being in a first position and taken from said air upon said valve being in a second position; a first relay means having a first energization winding and adapted to control the energization of the motor compressor; second relay means having a second energization winding, a first normally closed switch, three normally open switches, and fourth normally open switch and second normally closed switch, said fourth and said second closed switch having overlapping action whereby said fourth switch closes before said second switch opens; a source of power; a space thermostat having a first and a second temperature responsive switch means located in the space to be responsive to air temperature, said first temperature responsive switch means closing upon a need for heating; said second responsive switch means closing upon a need for cooling; circuit means connecting said first energization winding, said second responsive switch means and said first normally closed switch in series to said source whereby upon a call for cooling the motor compressor is energized; circuit means connecting said second energization winding, said first responsive switch means, and said second normally closed switch in series to said source; a holding circuit for said second relay comprising said fourth switch for connecting said second relay means directly across said source to maintain said second relay energized, a solenoid adapted for controlling the changeover valve to one of said first and second positions, circuit means including one of said three normally open switches for connecting said solenoid to said source so upon a call for heat by said first responsive switch means said changeover valve is operated in said first position, circuit means including one of said three switches for connecting said first energizing winding to said source, and a shorting circuit comprising one of said three normally open switches and said second responsive switch means for shunting said second energization winding upon a call for cooling to restore said changeover valve to said second position.

3. In an improved non-flushing heat pump control system, a refrigeration motor compressor, a first heat exchanger for heating or cooling space air, a second heat exchanger, a changeover valve for connecting said compressor to said heat exchanger to heat or cool the air depending upon said valve, a first space air temperature responsive switch means, said first switch closing upon a need for a change in the temperature in said space in a first direction, first relay means having an energization winding, a source of power, circuit means for connecting said energization winding and said first switch means in series to said source, means connecting said first relay means when energized to operate said changeover valve to a first position upon an initial call for said change in temperature by said first switch means, a holding circuit to maintain said first relay means energized when energized upon said first switch means closing, circuit means including said first switch means for connecting said compressor to said source upon a need for a temperature change, second space air temperature responsive switch means, said second switch closing upon a need for a change in the temperature in said space in an opposite direction to said first direction, circuit means including said second switch means for connecting said motor compressor to said source upon a need for said change in temperature, and circuit means for connecting said second switch means across said source to short circuit said source and render said holding circuit ineffective whereby said changeover valve is moved to a second position.

4. In a non-flushing heat pump control system having a refrigeration motor compressor, a first heat exchanger for heating or cooling space air, a second heat exchanger, and a changeover valve for connecting said compressor to said first and second heat exchangers to heat or cool the air depending upon said valve; a first space air temperature responsive switch means; first relay means having an energization winding; a source of power; circuit means including said first switch means for connecting said energization winding to said source; means connecting said first relay means when energized to operate said changeover valve to a heat position upon an initial call for heat by said first switch means; a holding circuit to maintain said first relay means energized when initially energized upon said call for heat, circuit means including said first switch means for connecting said compressor to said source upon a need for heat, second space air temperature responsive switch means closing upon a need for cooling in the space, circuit means including said second switch means for connecting said motor compressor to said source upon a need for cooling, and circuit means for connecting said second switch to render said holding circuit ineffective whereby said first relay means is de-energized and said changeover valve provides for cooling operation.

References Cited in the file of this patent
UNITED STATES PATENTS 2,182,691    Crago _____ Dec. 5, 1939
2,748,572    Parcaro _____ June 5, 1956